(12) United States Patent
Islam et al.

(10) Patent No.: US 6,982,537 B2
(45) Date of Patent: Jan. 3, 2006

(54) IDENTIFICATION OF PARAMETERS FOR SWITCHED RELUCTANCE ELECTRIC MACHINES

(75) Inventors: Mohammad S. Islam, Saginaw, MI (US); Sayeed A. Mir, Saginaw, MI (US); Tomy Sebastian, Saginaw, MI (US); Iqbal Husain, Copley, OH (US)

(73) Assignee: Delphi Technologies, Inc., Troy, MI (US)

( * ) Notice: Subject to any disclaimer, the term of this patent is extended or adjusted under 35 U.S.C. 154(b) by 257 days.

(21) Appl. No.: 10/404,420

(22) Filed: Mar. 31, 2003

(65) Prior Publication Data

US 2004/0189239 A1 Sep. 30, 2004

(51) Int. Cl.
  *H02P 1/46* (2006.01)
(52) U.S. Cl. .................... 318/701; 318/507; 318/560
(58) Field of Classification Search .............. 318/701, 318/567, 560, 715, 717, 798; 700/32
See application file for complete search history.

(56) References Cited

U.S. PATENT DOCUMENTS

| | | | |
|---|---|---|---|
| 6,137,257 A | 10/2000 | Heber et al. | |
| 6,456,031 B1 | 9/2002 | Gallegos-Lopez et al. | |
| 6,593,720 B2 | 7/2003 | Omekanda | |
| 2003/0028266 A1 * | 2/2003 | Jacques | 700/32 |

OTHER PUBLICATIONS

"Sensorless Speed Control of a Switched Reluctance Motor for Industrial Applications"; Authors: J. Wolff, R. Rahner and H. Späth; Optimization of Electrical and Electronic Equipments—Brasov 1998; vol. 2; pp. 457-462.
"A Sensor Less SR Motor Position Measurement Method"; Authors: Henrik Huovila and Olavi Karasti.

* cited by examiner

*Primary Examiner*—Karen Masih
(74) *Attorney, Agent, or Firm*—Michael D. Smith

(57) ABSTRACT

Disclosed herein is a method for parameter identification in a switched reluctance electric machine comprising: operating the switched reluctance electric machine in response to a desired command; and measuring an actual operating characteristic of the switched reluctance electric machine. The method also includes: modeling the switched reluctance electric machine to formulate an estimated operating characteristic based on the desired command; comparing the actual operating characteristic and the estimated operating characteristic to formulate an error there between; and determining a parameter estimate for the switched reluctance machine based on the error and a previous parameter estimate. Also disclosed herein is a system for estimating a parameter for a switched reluctance electric machine comprising: a switched reluctance electric machine including a sensor generating and transmitting a sensor signal indicative of a sensed characteristic; and a controller operatively coupled to the sensors executing the abovementioned methodology.

11 Claims, 3 Drawing Sheets

United States Patent
US 6,982,537 B2

IDENTIFICATION OF PARAMETERS FOR SWITCHED RELUCTANCE ELECTRIC MACHINES

BACKGROUND

This invention relates to identification of parameters for switched reluctance electric machines. More particularly, the invention relates to identification of the resistance and/or inductance for a switched reluctance electric machine.

The success of a high-performance controller for a switched reluctance motor mostly depends the a priori knowledge of the machine parameters. Not knowing the machine parameters is a common problem for all electric motor driven actuators. However, the problem becomes more acute in systems employing switched reluctance motors (SRMs). The controllability and performance of an SRM depends on the detailed knowledge about the machine parameters such as phase resistance, flux-current-angle (also denoted $\lambda$-i-$\theta$), torque-flux-angle (also denoted T-$\lambda$-$\theta$) and torque-current-angle (also denoted T-i-$\theta$) characteristics. Moreover, for mass-produced drives, the problem becomes more severe in that the parameters vary from machine to machine.

Therefore, it would be beneficial to provide a means for identification of parameters in switched reluctance motors for mass production.

BRIEF SUMMARY

Disclosed herein is a method for parameter identification in a switched reluctance electric machine comprising: operating the switched reluctance electric machine in response to a desired command; and measuring an actual operating characteristic of the switched reluctance electric machine. The method also includes: modeling the switched reluctance electric machine to formulate an estimated operating characteristic based on the desired command; comparing the actual operating characteristic and the estimated operating characteristic to formulate an error there between; and determining a parameter estimate for the switched reluctance machine based on the error and a previous parameter estimate.

Also disclosed herein is a system for estimating a parameter for a switched reluctance electric machine comprising: a switched reluctance electric machine including a sensor generating and transmitting a sensor signal indicative of a sensed characteristic; and a controller operatively coupled to the sensors executing the abovementioned methodology.

Further disclosed herein is a steering system with a switched reluctance electric motor and parameter estimation comprising: a steerable wheel coupled to a switched reluctance motor; a position sensor generating and transmitting a sensor signal indicative of a rotor position for the switched reluctance motor; and a controller operatively coupled to the motor and the position sensor. The controller generates a command to direct the motor and executing the abovementioned method for parameter estimation.

Disclosed herein in yet another embodiment is a system for estimating a parameter for a switched reluctance motor in a vehicle steering system comprising: a means for operating the switched reluctance electric machine in response to a desired command; and a means for measuring an actual operating characteristic of the switched reluctance electric machine. The system also includes a means for modeling the switched reluctance electric machine to formulate an estimated operating characteristic based on the desired command; a means for comparing the actual operating characteristic and the estimated operating characteristic to formulate an error there between; and a means for determining a parameter estimate for the switched reluctance machine based on the error and a previous parameter estimate.

Also disclosed herein in another exemplary embodiment is a storage medium encoded with a machine-readable computer program code, the computer program code including instructions for causing controller to implement the abovementioned method for parameter identification in a switched reluctance electric machine.

Further, disclosed herein in another exemplary embodiment is a computer data signal, the data signal comprising code configured to cause a controller to implement the abovementioned method for parameter identification in a switched reluctance electric machine.

BRIEF DESCRIPTION OF THE DRAWINGS

The present invention will now be described, by way of an example, with references to the accompanying drawings, wherein like elements are numbered alike in the several figures in which.

DESCRIPTION OF AN EXEMPLARY EMBODIMENT

Figure 1:
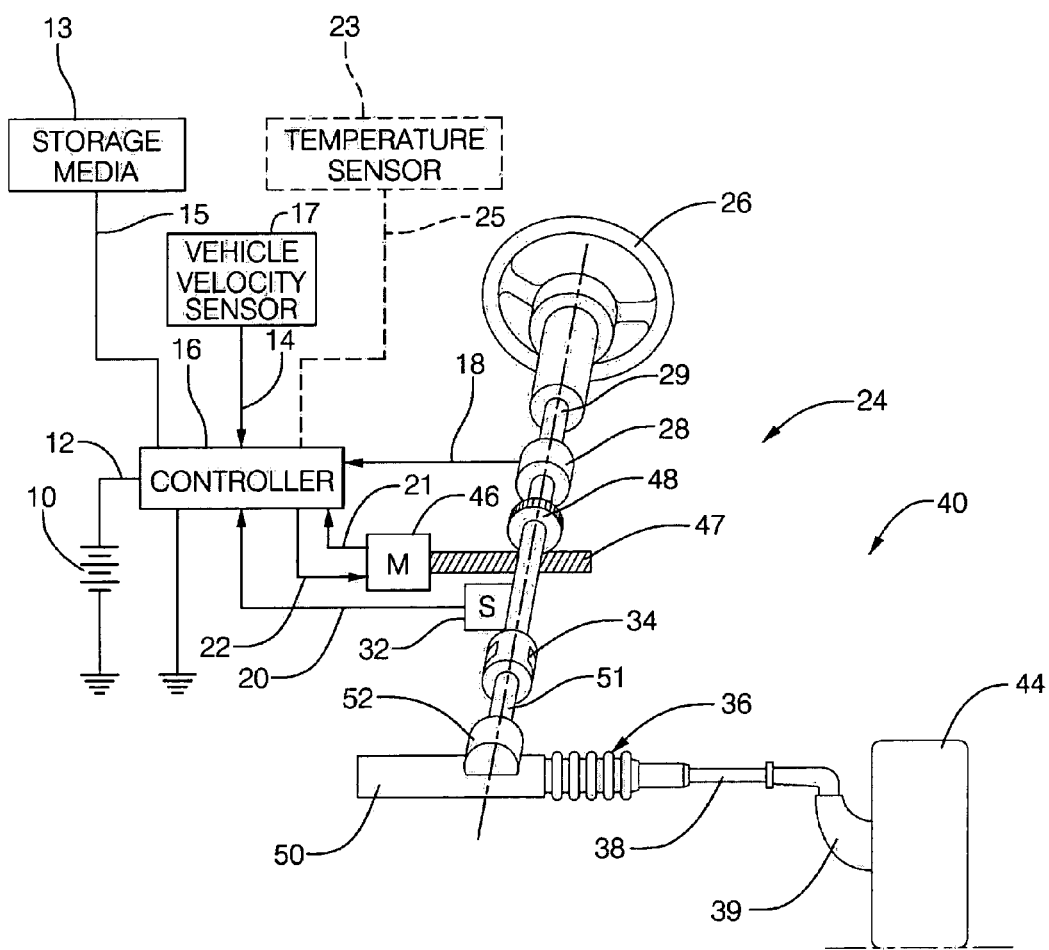
FIG. 1 depicts an electric power steering system employing an exemplary embodiment.

Referring to FIG. 1, reference numeral 40 generally designates a motor vehicle electric power steering system suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 46 in this instance a switched reluctance motor hereinafter denoted motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is the preferable torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing a switched reluctance type motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, or more specifically switched reluctance motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the necessary voltage(s) out of inverter (not shown), which may optionally be incorporated with controller 16 and will be referred to herein as controller 16, such that, when applied to the motor 46, the desired torque or position is generated. Because these voltages are related to the position and speed of the motor 46 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. An exemplary embodiment includes such a torque sensor 28 and the torque signal(s) 18 therefrom, as may be responsive to a compliant torsion bar, T-bar, spring, or similar apparatus (not shown) configured to provide a response indicative of the torque applied.

Optionally, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above-mentioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

As exemplified herein and disclosed above one such process may be identification of motor parameters. Controller 16 receives various input signals including, but not limited to, those identified above, to facilitate such processing and may provide one or more output signals in response. Once again, it will be appreciated that while the embodiment disclosed herein is explained by way of discussion concerning torque signals and torque sensors, other sensors and sensed parameters may be equally applicable.

In an exemplary embodiment, the controller 16 obtains as input signals or receives signals to facilitate computing, among others, a torque signal 18 from a torque sensor 28. The torque signal 18 is representative of the torque felt/applied by an operator of the vehicle or they may be combined in series to achieve a larger magnitude signal. Also received by the controller 16 are a variety of implementation specific parameters, signals and values for initialization and characterization of the prescribed processes and to identify various states of the processes herein.

As stated earlier, the success of a controller 16 for a switched reluctance motor (SRM) depends on the a priori knowledge of the motor parameters. The controllability and performance of an SRM 46 depends on the exact knowledge about the motor 46 such as phase resistance, flux-current-angle (λ-i-θ), and torque-current-angle (T-i-θ) characteristics. Parameter estimation may be necessary for high-performance SRM drives, since static models or look-up tables for predicting parameter migration may not represent the actual motor 46 adequately during dynamic operating conditions. Furthermore, the control angles and the motor parameters have to be tediously adjusted for each switched reluctance motor 46 independently due to the manufacturing imperfections. For mass-produced drives, this problem becomes more severe in that the parameters vary from motor to motor.

Disclosed herein is an adaptive identification methodology for parameter estimation in switched reluctance motors. Advantageously, the methodology is readily applicable to mass production where build variations exacerbate parameter variation anomalies. The methodology eliminates the need for a priori knowledge of the machine characteristics and may readily be applied online in operation to track the dynamics of the motor under running condition. Accurate knowledge of the motor parameters by this means ensures better controllability and performance of the SRM drive.

It will be appreciated that in the art, "self-tuning" and "adaptive" convey similar concepts with relation to parameter identification. Adaptive is often viewed as a method for continuous adjustment in operation, whereas self-tuning is viewed as a mechanism for initial adjustment. Thus, the adaptive methodology disclosed herein provides a means to identify and update the parameters on line e.g., in operation, so that the dynamics and effects thereof in the actual machine may be identified, tracked, and accounted for in real time. Advantageously, such online parameter identification as disclosed herein improves the performance of the controller 16 and SRM 46. Moreover, under selected conditions, the performance improvement facilitates employing a methodology for virtual operating characteristic identification and determination. For example, the methodology may be used for virtual torque determination alleviating the need for a torque sensor 28 for a direct torque-controlled SRM. It will be appreciated that while torque sensing is specifically disclosed, other characteristics e.g., temperature may also be readily identified employing the methodology disclosed herein.

Figure 2:
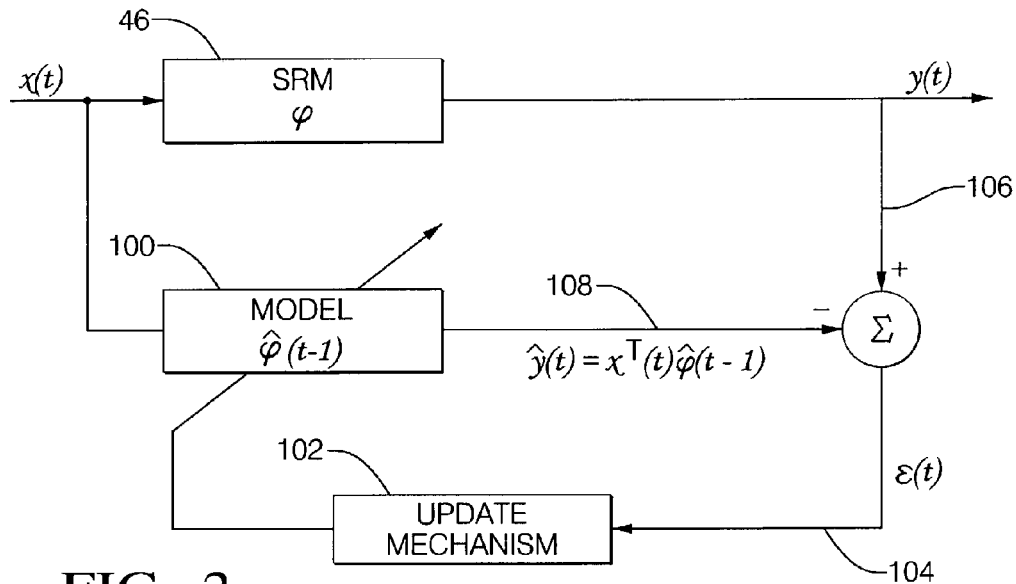
FIG. 2 is a simplified diagram depicting algorithm as may be employed in an exemplary embodiment for identification of the machine parameters.
Figure 3:
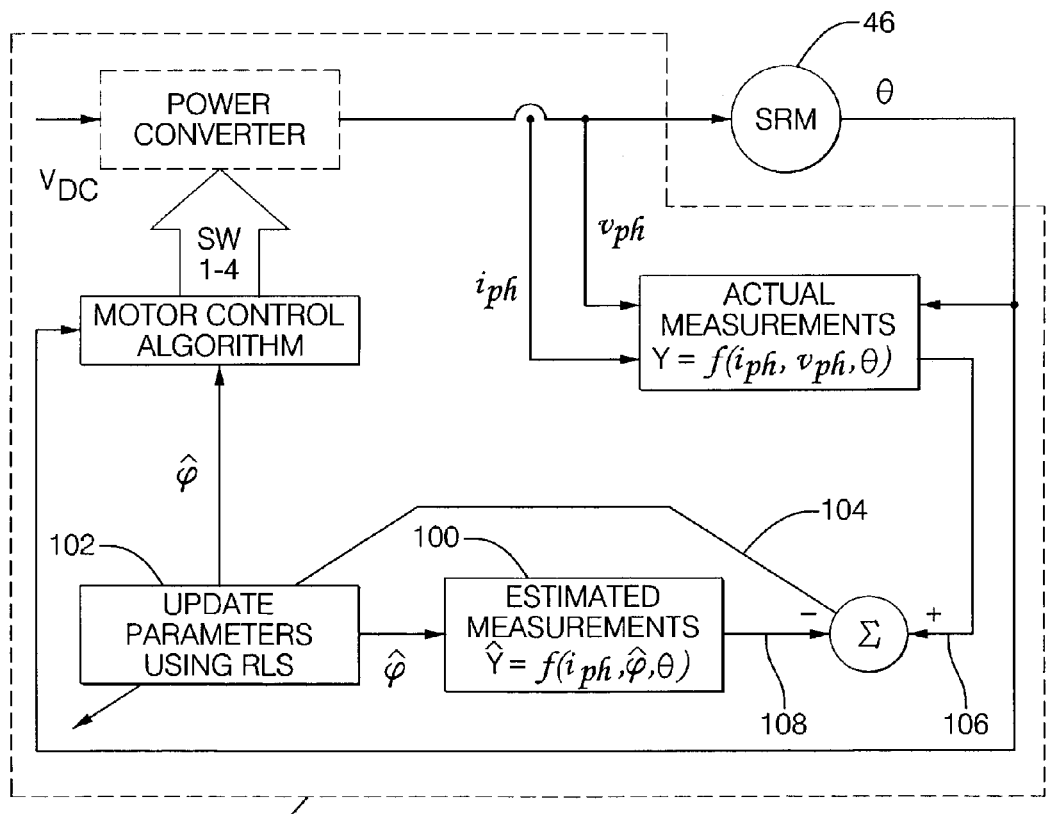
FIG. 3 is a simplified diagram depicting algorithm as may be employed in an exemplary embodiment for identification of the machine parameters.

Referring now to FIGS. 2 and 3 as well, simplified block diagrams for implementation of an exemplary methodology for identification of the machine parameters for a SRM 46 are depicted. In an exemplary embodiment, a recursive least square (RLS) algorithm may be employed. The RLS algorithm provides continuous, on line, updating mechanism. In FIG. 2 a generalized simplified block diagram of an adaptive recursive least square algorithm for identification of the parameters of SRM 46. In an exemplary embodiment, the algorithm utilizes a model 100 of the physical SRM 46. The model 100 may be in the form of a simple lookup table or closed loop analytical expression for emulating the operation of the SRM 46. An update mechanism 102 is employed to feedback errors 104 between the actual SRM characteristics 106 denoted y(t) and estimated characteristics 108. The update mechanism adjusts the existing parameter values by a selected iteration based upon the errors 104.

In an exemplary embodiment, the model 100 characterizes the flux-current-angle (λ-i-θ) or torque-current-angle (T-i-θ) properties of the SRM 46. As discussed herein, the flux-current-angle (λ-i-θ) characteristic for a particular phase is identified along with its resistance. The phase flux characteristics may be expressed as:

$$\lambda_j = f(\theta, i_j) = i_j L_j(\theta, i_j) \quad (1).$$

where $L_j(\theta, i_j)$ is the curvature of the inductance profile with respect to rotor position, θ and phase current $i_j$. This may be represented by a Fourier series function as:

$$L_j(\theta, i_j) = a_0(i_j) + \sum_{k=1}^{\infty} a_k(i_j)\cos\left(k\left(\theta - (j-1)\frac{2\pi}{N_{ph}}\right)\right) + b_k(i_j)\sin\left(k\left(\theta - (j-1)\frac{2\pi}{N_{ph}}\right)\right). \quad (2)$$

Simplifying the above expression to a finite number of coefficients, the flux model can be written in the form compatible to RLS algorithm as:

$$\int (V_j - i_j r_j) dt = i_j(a_0(i_j) + a_1(i_j)\cos\theta + a_2(i_j)\cos 2\theta + b_1(i_j)\sin\theta + b_2(i_j)\sin 2\theta) \quad (3),$$

which may be written in the vector form:

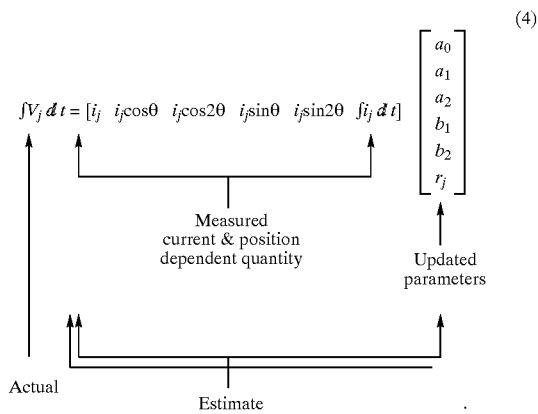

Measured current & position dependent quantity

Updated parameters

Actual    Estimate where the first vector (horizontal) represents the measured operating characteristics of the SRM 46, in this instance, current and position dependency. Likewise, the second vector (vertical) represents the coefficients, which may be updated in a recursive manner to enhance and the overall estimate.

Observation of Equation (4) as depicted above shows a vector notation of relationships in Equation (3). In operation of an exemplary embodiment, an implementation of such an RLS algorithm operates to minimize the error between the actual and estimated quantities. When the error approaches and achieves zero then estimated parameters represents the actual machine parameters and the coefficients are properly known. Thereafter, any dynamic changes in the characteristics of the SRM 46 may readily be addressed with continuous or intermittent updates.

Figure 4:
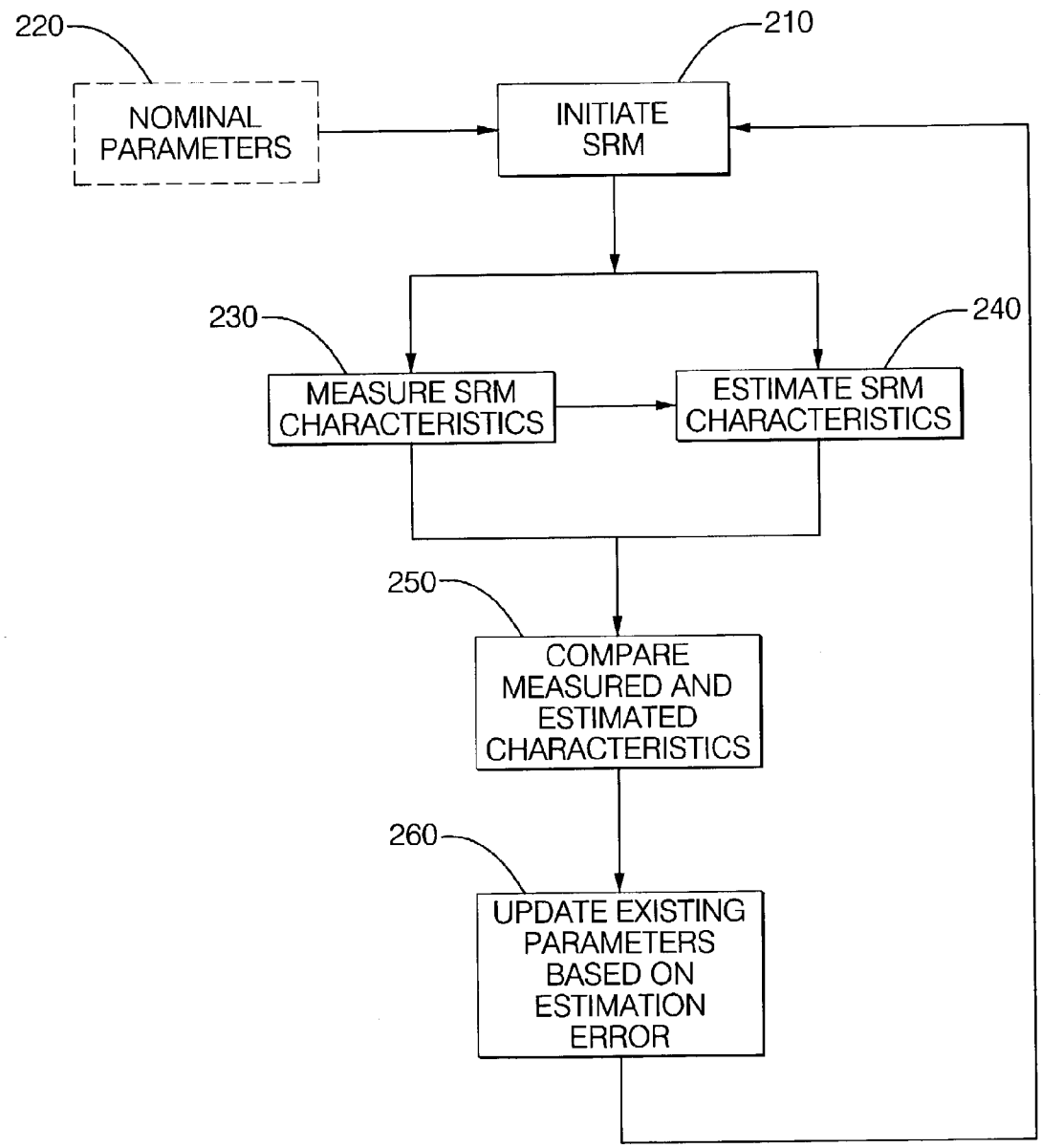
FIG. 4 depicts a flowchart of the methodology of parameter identification for an exemplary embodiment.

Referring now to FIGS. 3 and 4 as well, a more detailed block diagram of an adaptive recursive least square algorithm for motor control and identification of the parameters of SRM 46 is depicted. FIG. 4 depicts a flowchart of the methodology of parameter identification for an exemplary embodiment. In an exemplary embodiment, the algorithm utilizes the model 100 of the physical SRM 46. The model 100 implements the vector equation above for emulating the operation of the SRM 46. The phase voltage, denoted $v_{ph}$, phase current, denoted $i_{ph}$, and motor position, denoted θ are measured for comparison with estimated characteristics 108.

The update mechanism 102 is employed to update the SRM parameters and feedback errors 104 between the actual SRM characteristics 106 and estimated characteristics 108. The update mechanism adjusts the existing parameter values by a selected iteration based upon the errors 104.

Referring now to FIG. 4, the methodology is initiated at 210 with initiation and operation of the SRM 46 (FIG. 1). The initialization may optionally include nominal values for the parameters as depicted by block 220. Turning to block 230 and 240 respectively, the characteristics for the SRM 46 are measured as well as estimated employing the model 100 (FIG. 2). An error is generated based on the difference between the measured and estimated characteristics at block 250. Finally, at block 260, the existing parameters are updated in response to the error formulated at block 250.

Advantageously, it will be appreciated that the above identified approach may be applied to parameter identification for any switched reluctance machine regardless of variations in build, life, temperature, and the like, as well as combinations including at least one of the foregoing. Moreover, in another exemplary embodiment, it will be appreciated that the abovementioned techniques may readily be employed for implementation of virtual parameter sensing. For example, since the model represents the actual machine, when the model converges to a point of eliminating the error, the flux model parameters may thereafter be employed to predict the other parameters of the switched reluctance machine. In an exemplary embodiment, the torque may be ascertained yielding a virtual torque sensor using (5).

$$T_{motor} = \sum_{j=1}^{N_{ph}} T_j = \sum \frac{1}{2} i_j^2 \frac{dL_j(\theta, i_j)}{d\theta}. \quad (5)$$

In yet another embodiment, the temperature and temperature variation may be computed based upon the variation of the resistance, thereby yielding a virtual temperature sensor.

$$T = \frac{R_0 - R_T}{\alpha R_0} \quad (6)$$

where $R_0$ is the phase resistance at 0 degrees Celsius, $R_T$ is the updated resistance at T degrees Celsius and $\alpha$ is the temperature co efficient of the material of the winding.

Parameter identification that facilitates virtual sensors enables the elimination of fixed, expensive add-on sensors as would normally be employed in the art.

The disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code as a data signal 15, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for parameter identification in a switched reluctance electric machine comprising:
    operating said switched reluctance electric machine in response to a desired command;
    measuring an actual operating characteristic of said switched reluctance electric machine;
    modeling said switched reluctance electric machine to formulate an estimated operating characteristic based on said desired command;
    comparing said actual operating characteristic and said estimated operating characteristic to formulate an error there between; and
    determining a parameter estimate for said switched reluctance machine based on said error and a previous parameter estimate.

2. The method of claim 1 further including providing nominal parameters to said modeling.

3. The method of claim 1 further including updating said previous estimate based on said parameter estimate.

4. The method of claim 1 further including controlling said switched reluctance machine based on said parameter estimate.

5. The method of claim 1 wherein said desired command comprises at least one of a current command, a voltage command, and a torque command.

6. The method of claim 1 wherein said actual operating characteristic includes position.

7. The method of claim 1 wherein said modeling comprises a look-up table based on said desired command and said previous parameter estimate.

8. The method of claim 1 wherein said modeling comprises a recursive analytical expression based said desired command and said previous parameter estimate.

9. A system for estimating a parameter for a switched reluctance electric machine comprising:
    a switched reluctance electric machine including a sensor generating and transmitting a sensor signal indicative of a sensed characteristic;
    a controller operatively coupled to said sensors; and
    said controller executing method comprising:
        operating said switched reluctance electric machine in response to a desired command;
        measuring an actual operating characteristic of said switched reluctance electric machine;

modeling said switched reluctance electric machine to formulate an estimated operating characteristic based on said desired command;

comparing said actual operating characteristic and said estimated operating characteristic to formulate an error there between; and determining a parameter estimate for said switched reluctance machine based on said error and a previous parameter estimate.

10. A steering system with a switched reluctance electric motor and parameter estimation comprising:

a steerable wheel coupled to a switched reluctance motor;

a position sensor generating and transmitting a sensor signal indicative of a rotor position for said switched reluctance motor;

a controller operatively coupled to said motor and said position sensor;

said controller generating command to direct said motor and executing a method for parameter estimation comprising:

operating said switched reluctance electric machine in response to a desired command;

measuring an actual operating characteristic of said switched reluctance electric machine;

modeling said switched reluctance electric machine to formulate an estimated operating characteristic based on said desired command;

comparing said actual operating characteristic and said estimated operating characteristic to formulate an error there between;

determining a parameter estimate for said switched reluctance machine based on said error and a previous parameter estimate.

11. A system for estimating a parameter for a switched reluctance motor in a vehicle steering system comprising:

a means for operating said switched reluctance electric machine in response to a desired command;

a means for measuring an actual operating characteristic of said switched reluctance electric machine;

a means for modeling said switched reluctance electric machine to formulate an estimated operating characteristic based on said desired command;

a means for comparing said actual operating characteristic and said estimated operating characteristic to formulate an error there between;

a means for determining a parameter estimate for said switched reluctance machine based on said error and a previous parameter estimate.

* * * * *